United States Patent
Chuang

(10) Patent No.: US 8,297,696 B2
(45) Date of Patent: *Oct. 30, 2012

(54) BICYCLE SADDLE

(76) Inventor: Louis Chuang, Taichung (TW)

( * ) Notice: Subject to any disclaimer, the term of this patent is extended or adjusted under 35 U.S.C. 154(b) by 612 days.

This patent is subject to a terminal disclaimer.

(21) Appl. No.: 12/495,890

(22) Filed: Jul. 1, 2009

(65) Prior Publication Data

US 2009/0261632 A1   Oct. 22, 2009

Related U.S. Application Data

(63) Continuation-in-part of application No. 11/307,234, filed on Jan. 27, 2006, now Pat. No. 8,047,604.

(30) Foreign Application Priority Data

Nov. 17, 2005  (TW) ............................. 94140496 A
Jan. 27, 2006  (TW) ............................. 95103691 A

(51) Int. Cl.
B62J 1/26   (2006.01)
(52) U.S. Cl. ....................................... 297/199; 297/202
(58) Field of Classification Search ................. 297/199, 297/200, 202, 214
See application file for complete search history.

(56) References Cited

U.S. PATENT DOCUMENTS

| | | | |
|---|---|---|---|
| 579,442 A * | 3/1897 | Poole .......................... | 297/199 X |
| 629,956 A | 8/1899 | Craig ............................ | 297/201 |
| 649,875 A | 3/1902 | Meighan ...................... | 297/201 |
| 823,916 A | 6/1906 | Brooks et al. .................. | 297/207 |
| 3,997,214 A | 12/1976 | Jacobs .......................... | 297/214 |
| 4,063,775 A | 12/1977 | Mesinger ...................... | 297/201 |
| 4,429,915 A | 2/1984 | Flager .......................... | 297/199 |
| 4,512,608 A | 4/1985 | Erani ............................ | 297/201 |
| 4,877,286 A | 10/1989 | Hobson et al. ................ | 297/195 |
| 5,147,685 A | 9/1992 | Hanson ........................ | 428/189 |
| 5,203,606 A | 4/1993 | Granzotto ..................... | 297/201 |
| 5,203,607 A | 4/1993 | Landi ........................... | 297/214 |
| 5,280,993 A * | 1/1994 | Hsh .............................. | 297/199 X |
| 5,286,082 A | 2/1994 | Hanson ........................ | 297/201 |
| 5,330,249 A | 7/1994 | Weber et al. .................. | 297/214 |
| 5,348,369 A | 9/1994 | Yu ................................ | 297/214 |
| 5,676,420 A | 10/1997 | Kuipers et al. ............... | 297/204 |
| 5,823,618 A | 10/1998 | Fox et al. ..................... | 297/202 X |
| 5,911,475 A | 6/1999 | Nakahara ................... | 297/219.11 |
| 5,921,624 A | 7/1999 | Wu ............................. | 297/215.14 |
| 6,106,059 A | 8/2000 | Minkow et al. ............... | 297/202 |
| 6,176,546 B1 | 1/2001 | Andrews ...................... | 297/195.1 |
| 6,402,236 B1 | 6/2002 | Yates ............................ | 297/201 |
| 6,450,572 B1 | 9/2002 | Kuipers ...................... | 297/202 X |
| 6,666,507 B1 | 12/2003 | Ringgard .................... | 297/195.1 |
| 6,739,656 B2 | 5/2004 | Yu .............................. | 297/215.16 |
| 6,752,453 B1 | 6/2004 | Yapp ........................... | 297/215.14 |

(Continued)

OTHER PUBLICATIONS

Japanese Utility Model Publication No. JP 1993035573 U, May 15, 1993, 12 pages.

(Continued)

Primary Examiner — Anthony D Barfield
(74) Attorney, Agent, or Firm — Alan Kamrath; Kamrath IP Lawfirm, PA

(57) ABSTRACT

A bicycle saddle includes front and rear portions; an elastic member disposed between the front and rear portions; and a valve assembly installed to the bottom of the saddle between the front and middle portions and including an air pump and an air escape valve communicating with the elastic member.

17 Claims, 10 Drawing Sheets

U.S. PATENT DOCUMENTS

| | | | |
|---|---|---|---|
| 6,871,907 B2 | 3/2005 | Morita et al. | 297/195.1 |
| 6,886,887 B2 | 5/2005 | Yu | 297/202 X |
| 7,055,900 B2 | 6/2006 | Losio et al. | 297/195.1 |
| 7,121,622 B1 | 10/2006 | Mendez | 297/202 X |
| 7,178,869 B2 | 2/2007 | Ljubich | 297/201 |
| 7,661,757 B2 * | 2/2010 | Chuang | 297/202 X |
| 7,699,392 B2 * | 4/2010 | Chuang | 297/202 X |
| 2002/0096917 A1 | 7/2002 | Turudich | 297/202 |
| 2004/0004375 A1 | 1/2004 | Garland et al. | 297/204 |
| 2004/0056519 A1 | 3/2004 | Kastarlak | 297/195.1 |
| 2006/0071516 A1 | 4/2006 | Pandozy | 297/202 X |
| 2007/0108808 A1 | 5/2007 | Chuang | 297/195.1 |
| 2007/0176472 A1 | 8/2007 | Chuang | 297/202 |

OTHER PUBLICATIONS

Japanese Utility Model Publication No. JP 1943006231 Y, Jun. 8, 1943, 02 pages.

Chinese Patent Publication No. CN 2262520 Y, Sep. 17, 1997, 06 pages.

Chinese Patent Publication No. CN 2499308 Y, Jul. 10, 2002, 09 pages.

Chinese Patent Publication No. CN 2523668Y, Dec. 4, 2002, 15 pages.

Chinese Patent Publication No. CN 1521079 A, Aug. 18, 2004, 10 pages.

Chinese Patent Publication No. CN 1629030 A, Jun. 22, 2005, 13 pages.

European Patent Publication No. EP 1394025 A1, Mar. 3, 2004, 14 pages.

Japanese Patent Publication No. JP 57198179 A, Dec. 4, 1982, 04 pages.

Japanese Utility Model Publication No. JP 3012678 U, Feb. 8, 1991, 13 pages.

Japanese Utility Model Publication No. JP 3112830 U, Nov. 19, 1991, 17 pages.

Japanese Utility Model Publication No. JP 3012678 U, Jun. 20, 1995, 08 pages.

Japanese Utility Model Publication No. JP 3112830 U, Aug. 25, 2005, 09 pages.

* cited by examiner

BICYCLE SADDLE

CROSS REFERENCE TO RELATED PATENT APPLICATION

This application is a continuation-in-part application of application Ser. No. 11/307,234, filed Jan. 27, 2006, now U.S. Pat. No. 8,047,604, the contents of which are incorporated herein by reference.

BACKGROUND OF THE INVENTION

1. Field of the Invention

The present invention relates to a bicycle saddle and, more particularly, to a bicycle saddle with an air pump for flex adjustment of the saddle.

2. Description of the Related Art

As Boston University and some Italian experts discuss in three essays in the Journal of Sexual Medicine, September 2005, the longer the rider rides, the higher the risks of erectile dysfunction and loss of libido are. The perineum 80, between the external genitals 82 and the anus, could be where things go wrong. While sitting on an ordinary saddle, a person has his ischium 81 take his weight. While riding, his perineum 80 takes his weight.

On New York Times Weekly, Oct. 17, 2005, page 6 is a report about the essays in the Journal of Sexual Medicine. According to this report, in the perineum 80 is a sheath called Alcock's canal for containing the artery and the nerve leading to the penis. Sitting on the saddle 90, the rider has his perineum take his weight so that the amount of blood that goes to the penis is significantly reduced. By and by, the rider suffers erectile dysfunction and loses libido. Moreover, the rider might suffer saddle-related trauma that results in calcified masses in his scrotum.

Echoing the essays and reports, Mr. Steven Schrader, an expert in the field of external genitals working in the USA National Institute for Occupational Safety and Health, asserts that the poorly designed saddle 90 inevitably entails erectile dysfunction and that the problem now is how to respond. The saddle 90 is hazardous to a rider's health, and improvements are needed.

The present invention is therefore intended to obviate or at least alleviate the problems encountered in the prior art.

SUMMARY OF THE INVENTION

According to the present invention, a bicycle is provided with a saddle. The saddle includes a front portion, rear portions and a middle portion. A first space is defined above the middle portion and between the front and rear portions, and a second space is defined between the rear portions. An elastic member is disposed at the first space.

An advantage of the saddle of the present invention is that the elastic member disposed at the first space can accommodate the rider's external genitals. The external genitals will not be pressed against the saddle. The scrotum will not be hurt, and a calcified mass will not form in the scrotum.

Another advantage of the saddle of the present invention is that the thighs will not rub against the saddle, so that the rider will not feel any pain on the thighs and so that the rider can move the thighs without any interference by the saddle.

Still another advantage of the saddle of the present invention is that the elastic member disposed at the first space can accommodate the perineum, so that the artery and the nerve in the Alcock's canal will not be pressed against the saddle and so that the circulation of blood to the penis will not be suppressed.

Other objectives, advantages, and features of the invention will become more apparent from the following detailed description when taken in conjunction with the accompanying drawings.

DETAILED DESCRIPTION OF THE PREFERRED EMBODIMENT

Figure 1:
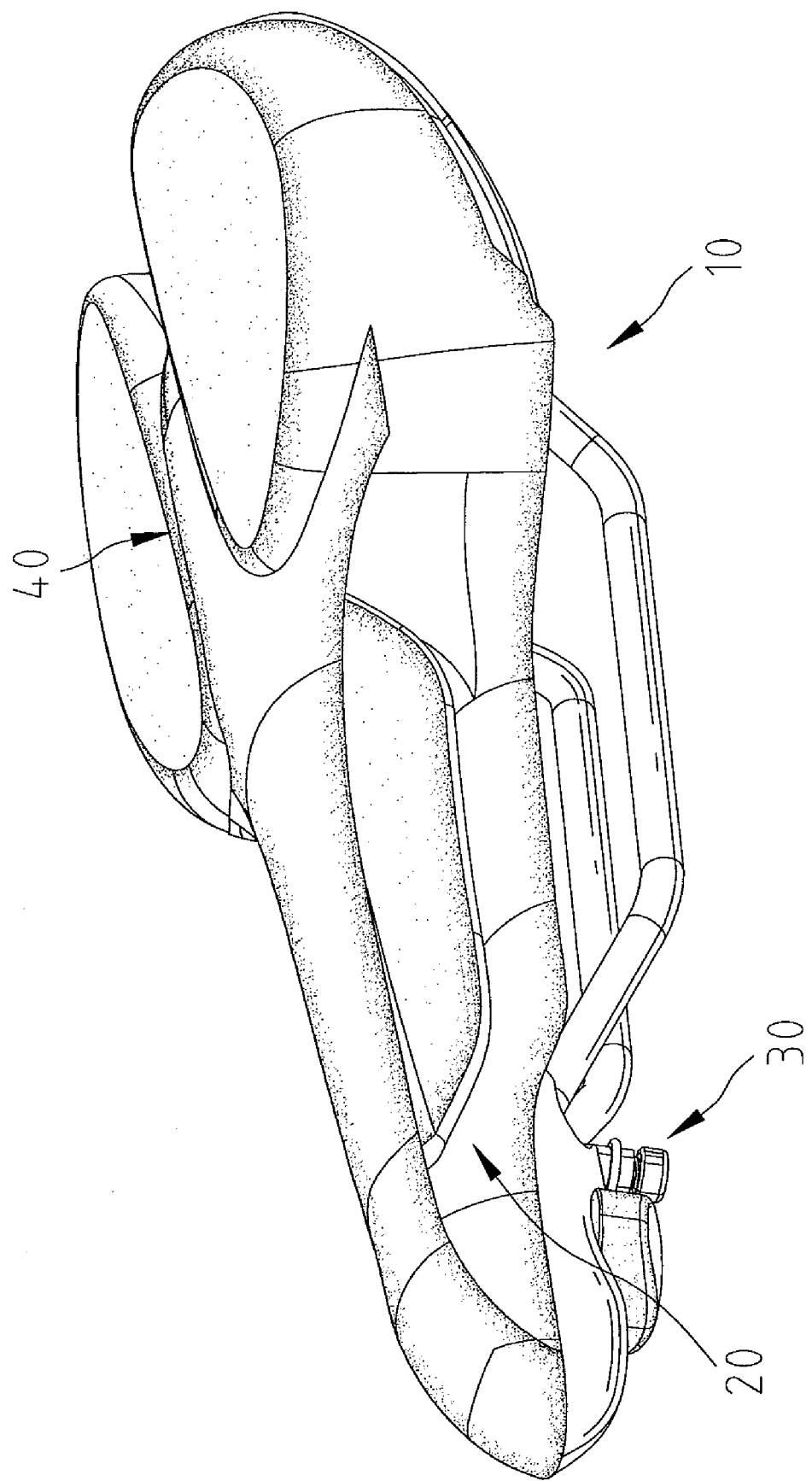
FIG. 1 is a perspective view of a bicycle saddle according to the preferred embodiment of the present invention.
Figure 2:
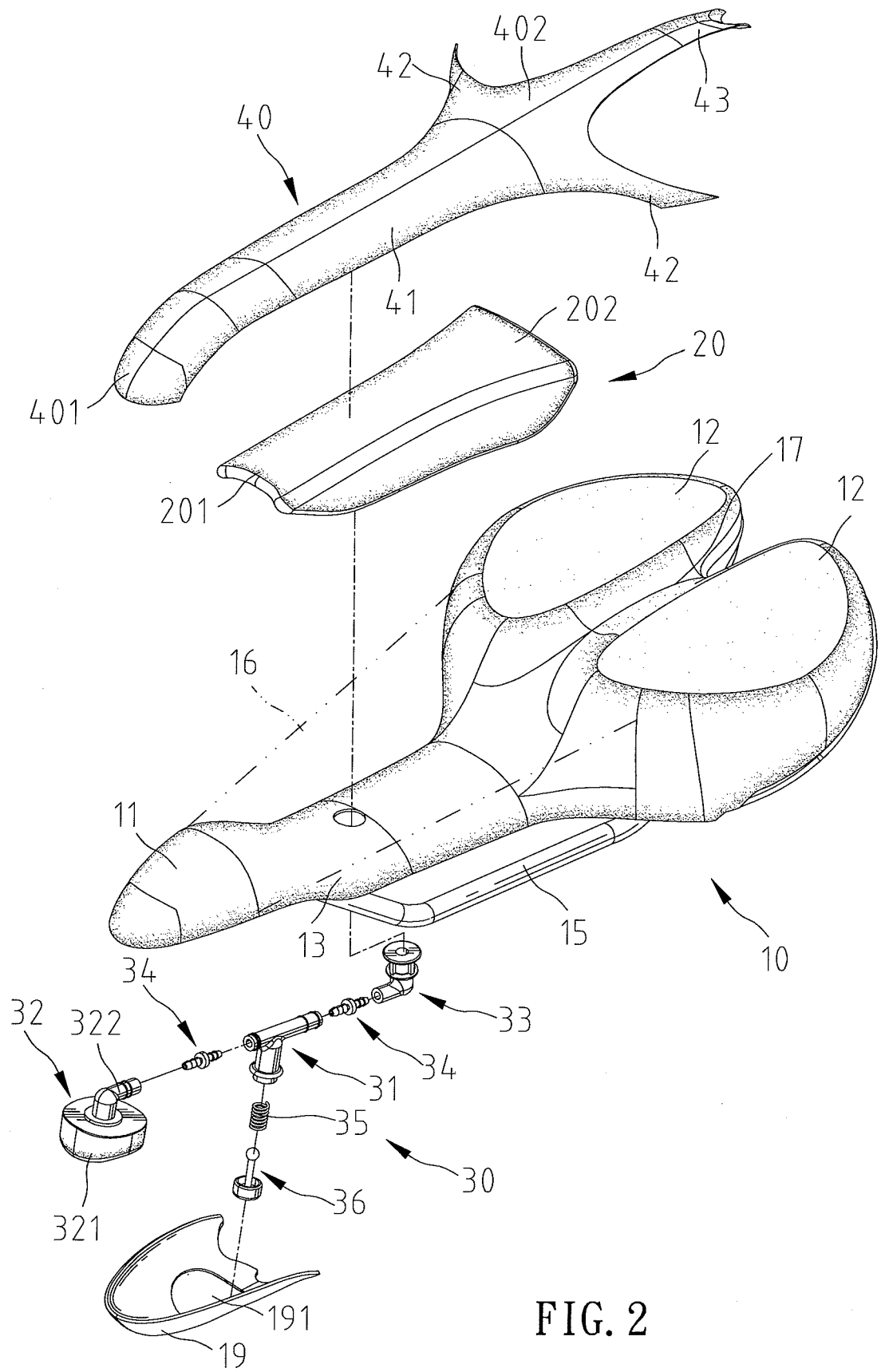
FIGS. 2 and 3 are exploded views of the bicycle saddle shown in FIG. 1.

FIGS. 1 through 10 show a bicycle saddle in accordance with the preferred embodiment of the present invention. The bicycle saddle includes a saddle 10, an elastic member 20, a valve assembly 30 and a cover member 40. The saddle 10 includes a front portion 11, two rear portions 12 opposite to the front portion 11 and a middle portion 13 contiguously connecting the front and rear portions 11 and 12 to each other. Two beams 15 are provided at the bottom of the saddle 10 and adapted for connecting the front portion 11 to the rear portions 12. A first space 16 is defined above the middle portion 13. Further, a horizontal position of the middle portion 13 is lower than that of the front and rear portions 11 and 12. A second space 17 is defined between the two rear portions 12 and has a width which is smaller than a width of the first space 16. With the second space 17 between the rear portions 12, a rider's perineum will not be pressed against the saddle. The artery and the nerve in the Alcock's canal will not be pressed. The circulation of blood to the rider's penis will not be suppressed.

The elastic member 20 is disposed on the first space 16, and two side portions 21 thereof are able to extend from two sides of the first space 16 outwardly, respectively. The valve assembly 30 is installed at the bottom of the saddle 10 between the front and middle portions 11 and 13 and connected to the elastic member 20 via the middle portion 13 as to pump/release air into/from the elastic member 20 for flex adjustment of the saddle 10.

The elastic member 20 includes a front portion 201 and a rear portion 202, and the side portions 21 are defined between the front and rear portions 201 and 202. The front and rear portions 201 and 202 of the elastic member 20 respectively correspond to the rear of the front portion 11 and the front of the two rear portions 12 of the saddle 10. Thus, the elastic member 20 is able to fittingly be disposed on the middle portion 13 of the saddle 10. Further, a width of the front portion 201 is smaller than that of the rear portion 202.

The cover member 40 is spread between the front and rear portions 11 and 12 of the saddle 10 and covered on the elastic member 20 for supporting the rider's external genitals without substantially pressing the rider's external genitals and perineum. Front and rear portions 401 and 402 are defined at two ends of the cover member 40 and respectively attach onto the front and rear portions 11 and 12. The front portion 401 of the cover member 40 corresponds to the front portion 11 of the saddle 10. A middle portion 41 is defined between the front and rear portions 401 and 402 of the cover member 40 and covers the top of the elastic member 20. The rear portion 402 includes two lateral tails 42 and a rear tail 43 between the lateral tails 42. The rear tail 43 is attached to the second space 17 between the rear portions 12 of the saddle 10. The two lateral tails 42 are respectively attached to the outer periphery of the two rear portions 12 of the saddle 10. Hence, the cover member 40 can be firmly attached to the saddle 10. While the cover member 40 is attached to the saddle 10, the two sides of the first space 16 are still opened, and the two side portions 21 of the elastic member 20 are exposed out of the cover member 40.

Figure 3:
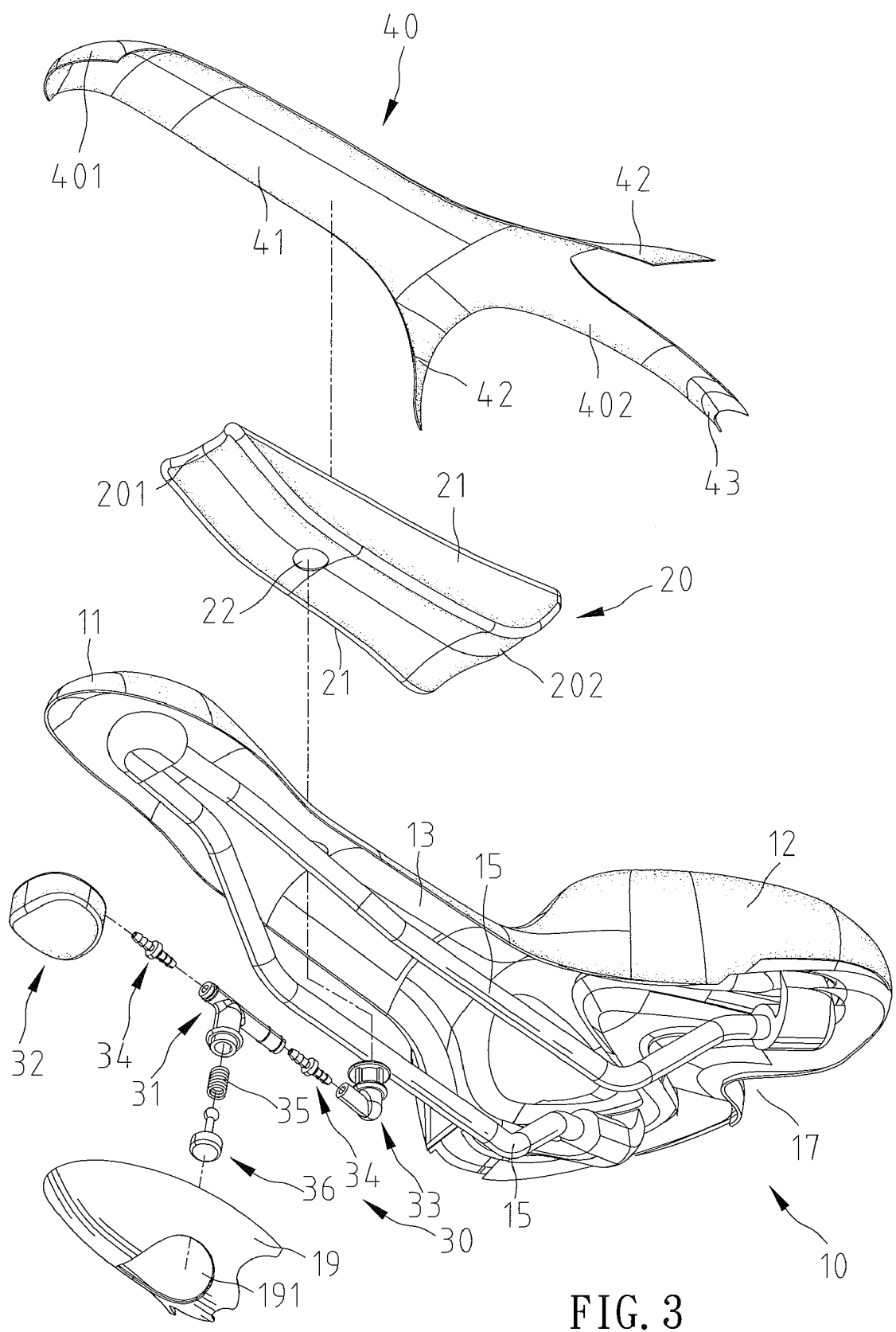
Figure 4:
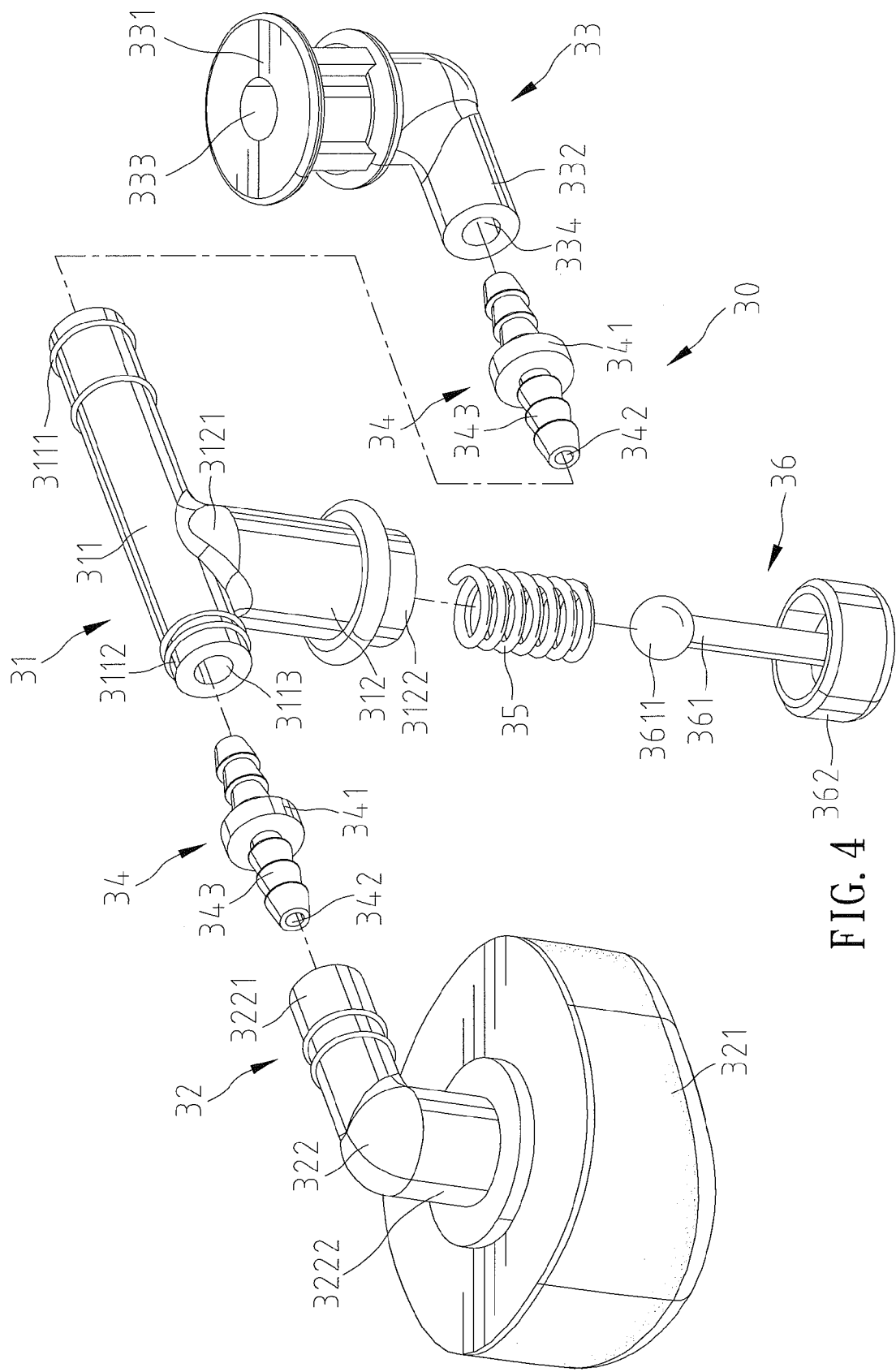
FIG. 4 is an enlarged, exploded view of a valve assembly of the bicycle saddle shown in FIG. 2.

The valve assembly 30 includes a first connective valve 31, an air pump 32, a second connective valve 33, two connective nozzles 34, an elastic element 35 and an air escape valve 36. In use, the second connective valve 33 is connected to the bottom of the elastic member 20 via an orifice 22 (as shown in FIG. 3). The first connective valve 31 is provided between the second connective valve 33 and the air pump 32 and connects the second connective valve 33 to the air pump 32 via the two connective nozzles 34. The air escape valve 36 is installed to another side of the first connective valve 31 opposite to the second connective valve 33 and the air pump 32, and the elastic element 35 is provided between the first connective valve 31 and the air escape valve 36.

The first connective valve 31 includes a first section 311 having first and second ends 3111 and 3112 and a second section 312 having first and second ends 3121 and 3122. The first section 311 is perpendicular to and in communication with the second section 312, and the first end 3121 of the second section 312 is attached to the first section 311 between the first and second ends 3111 and 3112. First and second channels 3113 and 3123 are respectively formed in the first and second sections 311 and 312 and selectively communicate with each other.

The air pump 32 includes a pressing member 321 and a duct portion 322 attached onto the pressing member 321. Thus, while the pressing member 321 is pumped, air pumped by the pressing member 321 would pass through the duct portion 322. The duct portion 322 is preferably L-shaped and includes first and second ends 3221 and 3222. The first end 3221 is adapted to connect to the second end 3112 of the first section 311 via one connective nozzle 34, and the second end 3222 is coupled to the pressing member 321. A pump channel 3223 is formed inside of the duct portion 322 and communicates the pressing member 321 with the duct portion 322.

The second connective valve 33 is preferably L-shaped and includes first and second ends 331 and 332. The second end 332 is adapted to connect to the first end 3111 of the first section 311 via another connective nozzle 34. First and second passageways 333 and 334 are respectively formed inside of the first and second ends 331 and 332 of the second connective valve 33.

Figure 5:
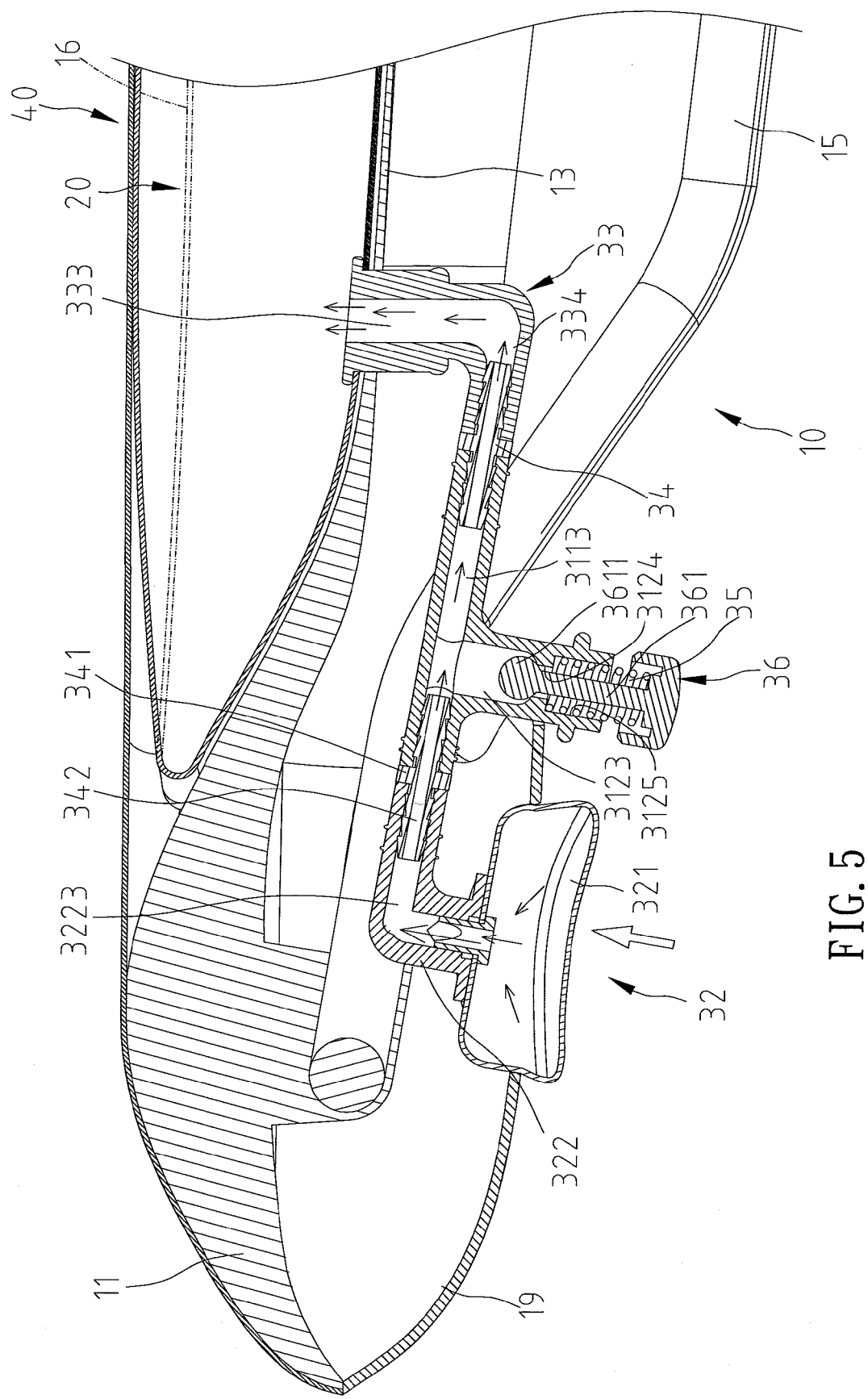
FIG. 5 is a partial, enlarged cross-sectional view of the bicycle saddle shown in FIG. 1, illustrating pumping an air pump for filling air into an elastic member.
Figure 6:
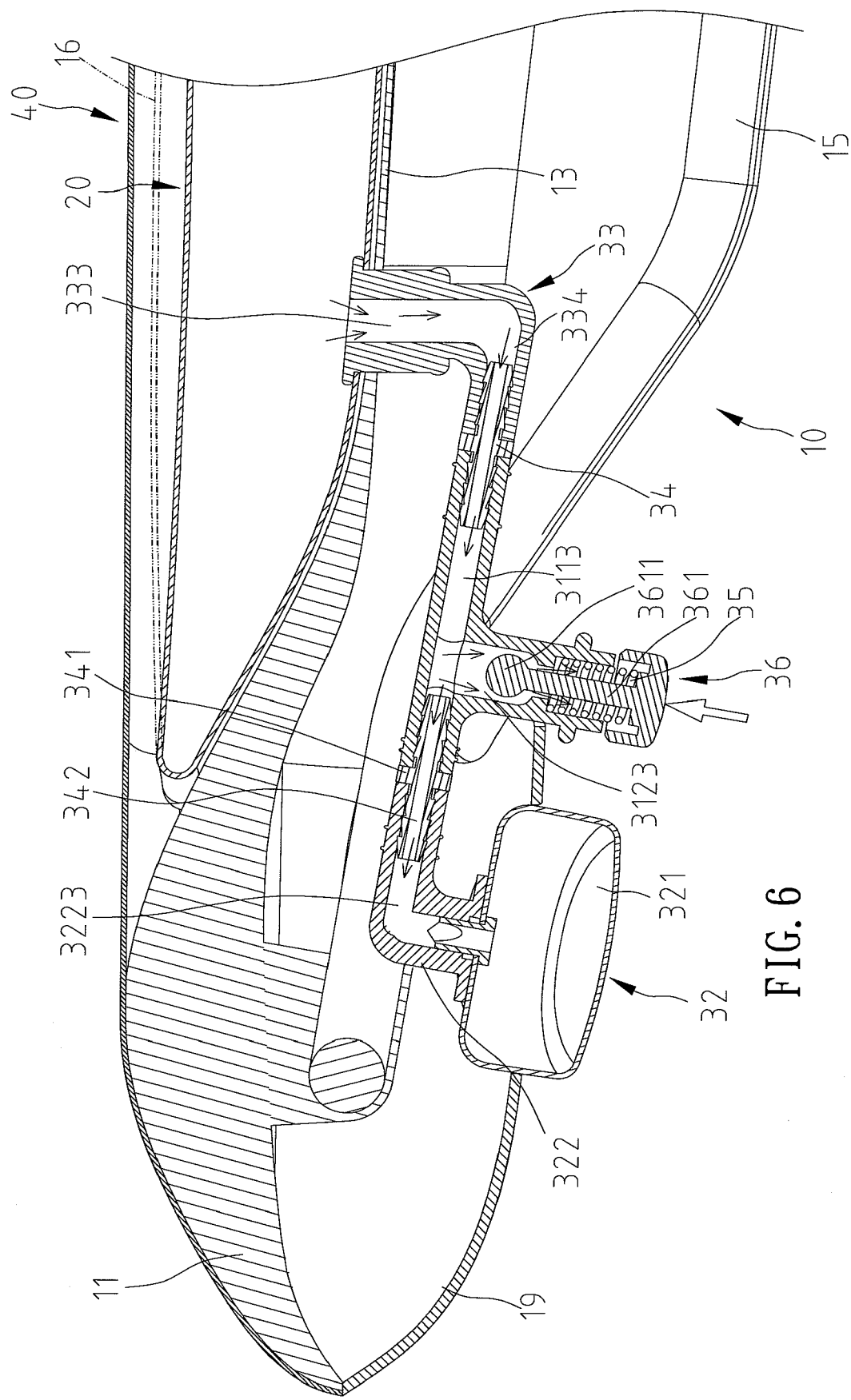
FIG. 6 is another partial, enlarged cross-sectional view of the bicycle saddle shown in FIG. 1, illustrating operation of an air escape valve for releasing air from the elastic member.
Figure 7:
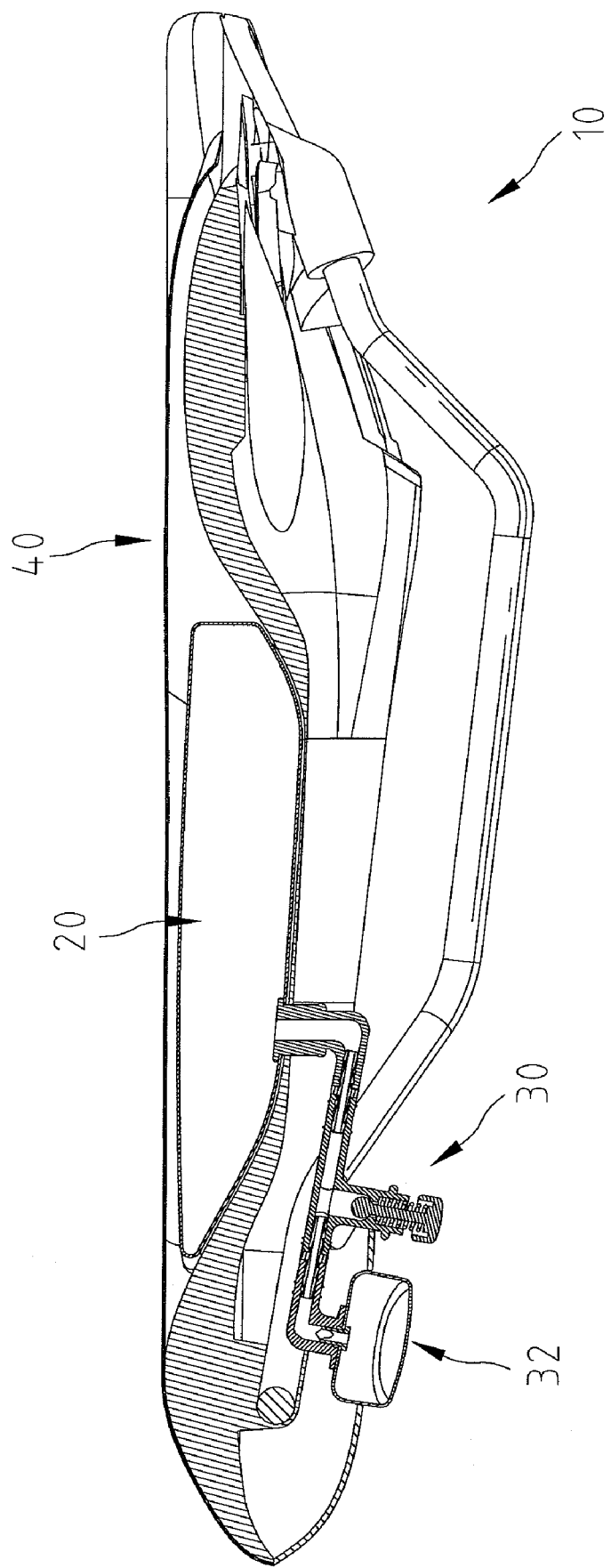
FIG. 7 is a cross-sectional view of the bicycle saddle shown in FIG. 1, illustrating the elastic member filled with air.
Figure 8:
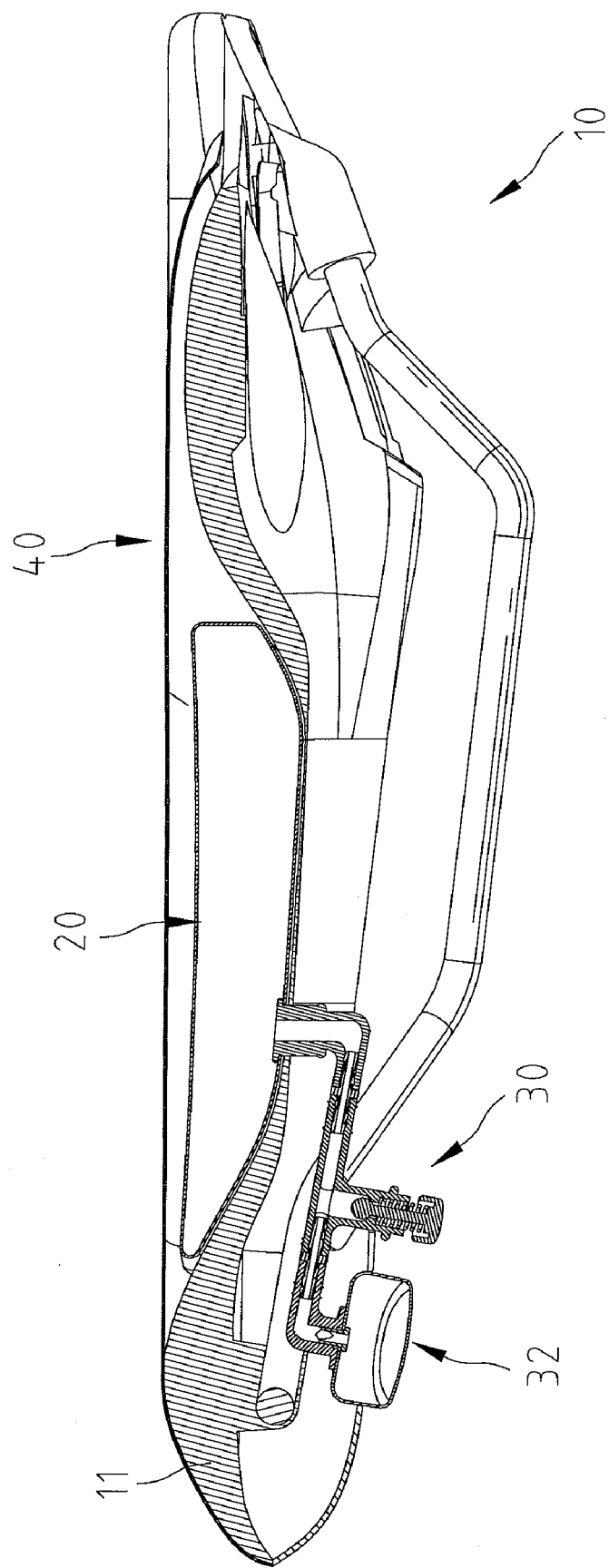
FIG. 8 is a cross-sectional view of the bicycle saddle shown in FIG. 1, illustrating air filled in the elastic member has been released partially.
Figure 9:
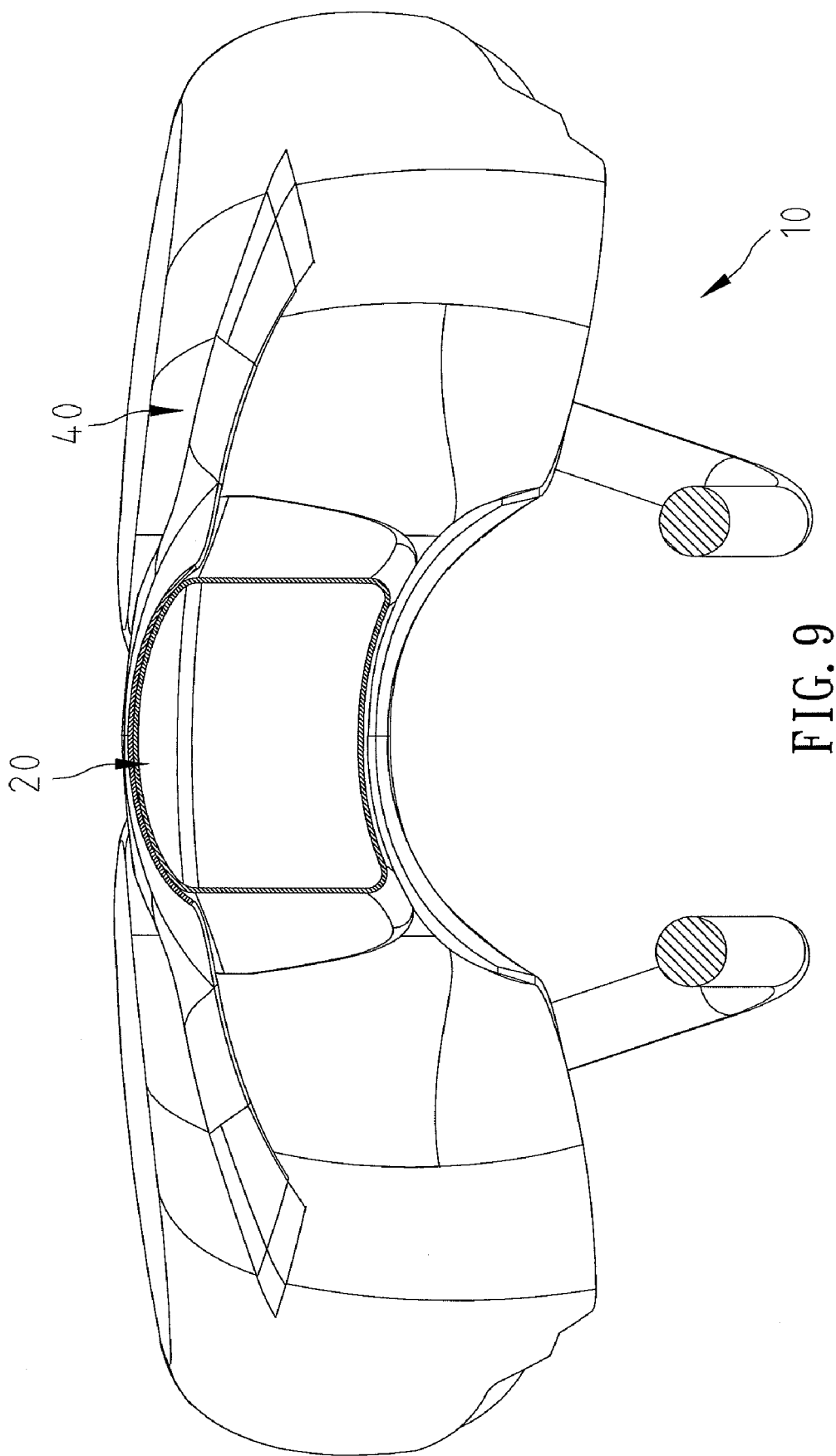
FIG. 9 is a rear view of the bicycle saddle shown in FIG. 7.
Figure 10:
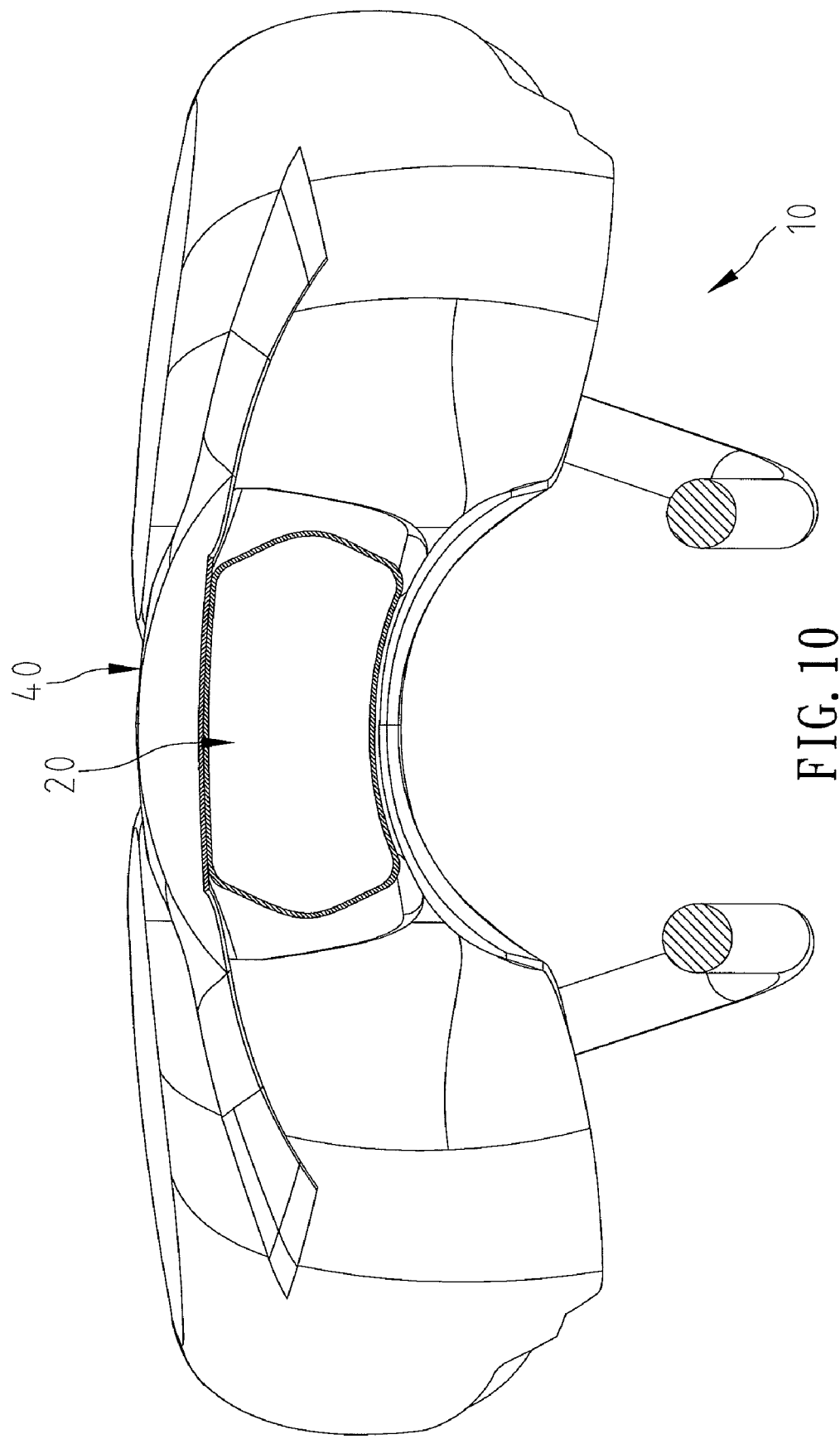
FIG. 10 is a rear view of the bicycle saddle shown in FIG. 8.

The air escape valve 36 is inserted to the second section 312 of the first connective valve 31 from the second end 3122 of the second section 312 and includes an inserted portion 361 and a pressed portion 362. The elastic element 35 is mounted on the inserted portion 361. An enlarged end 3611 is formed on the distal end of the inserted portion 361. The second section 312 of the first connective valve 31 further includes a block portion 3124 and a receiving portion 3125 (as shown in FIG. 5). A diameter of the block portion 3124 is smaller than that of the enlarged end 3611 and the second channel 3123 of the second section 312. The elastic element 35 is received in the receiving portion 3125 and between the block portion 3124 and the pressed portion 362. In a normal position as shown in FIG. 5, the enlarged end 3611 is abutted against the block portion 3124, and the first and second channels 3113 and 3123 do not communicate with each other. In a release position as shown in FIG. 6, the pressed portion 362 is pressed toward the second section 312, and the enlarged end 3611 is detached from the block portion 3124, and the first and second channels 3113 and 3123 channels communicate with each other.

Each connective nozzle 34 includes a center block 341 formed on the outer periphery thereof between two ends thereof and two projecting portions 343 formed on the outer periphery of the two ends thereof. A channel 342 is formed inside of each connective nozzle 34 and communicates the two ends of each connective nozzle 34 with each other.

Moreover, a cap member 19 is installed to the bottom of the saddle 10 and corresponds to the front portion 11. An opening 191 is formed on the cap member 19. In use, the cap member 19 just covers the air pump 32, and the pressing member 321 is exposed from the opening 191 for operation.

FIG. 5 shows air pumped into the elastic member 20 by pumping the air pump 32 of the valve assembly 30. The first end 3221 of the duct portion 322 of the air pump 32 is coupled to the second end 3112 of the first section 311 of the connective valve 31 via one of the connective nozzle 34. Hence, the pump channel 3323 of the duct portion 322, the channel 342 of the one of the connective nozzles 34 and the first channel 3113 of the first section 311 are in communication with one another. Likewise, the second end 332 of the second connective valve 33 is coupled to the first end 3111 of the first section 311 of the connective valve 31 via another connective nozzle 34. Hence, the first channel 3113 of the first section 311, the channel 342 of the one of the connective nozzles 34 and the second passageway 334 of the second connective valve 33 are in communication with one another. Further, the air escape valve 36 is in the normal position. Therefore, while pumping the pressing member 321 of the air pump 32, air passes through the duct portion 322, the first section 311 of the first connective valve 31 and the second connective valve 33 and is filled into the elastic member 20 to adjust flex of the elastic member 20.

FIG. 6 shows air released from the elastic member 20 by operating the air escape valve 36. Connection of the air pump 32, the two connective nozzles 34, and the first and second connective valves 31 and 32 is the same as shown in FIG. 5. However, the pressed portion 362 of the air escape valve 36 is pressed toward the second section 312 of the first connective valve 31 so that the elastic element 35 is compressed and that the enlarged end 3611 is away from the block portion 3124 towards the second channel 3123 of the first connective valve 31. Thus, between the inserted portion 361 and the block portion 3124, there's a gap (not numbered). Air released from the elastic member 20 could pass through the gap and escapes out of the valve assembly 30.

From the above discussion of the flex-adjustable bicycle saddle, riders can adjust flex of the bicycle saddle in the present invention through pumping/releasing air into/from the elastic member 20 depended on their needs. Generally speaking, while riding on a mountain road, flex of the bicycle saddle is related to comfort of riders. If the saddle of bicycle is over filled with air, the saddle would be getting too hard with the riders' perineum suffering by excessive compression from the saddle. Further, if the riders' perineum is compressed after a long time riding, the riders might possibly lose some function of the external genital organs. Therefore, flex of the bicycle saddle can be adjusted to an appropriate level for protecting the riders' perineum from the impact during riding but not compressing excessively the riders' perineum.

While several embodiments of the invention have been shown and described, it will be apparent to those skilled in the art that modifications may be made therein without departing from the scope and spirit of the present invention.

What is claimed is:

1. A bicycle saddle comprising:
   a bottom;
   a front portion and two rear portions opposite to the front portion each having a top surface;
   a middle portion defined between and contiguously connecting the front portion and the two rear portions to each other, with the bottom connecting the front and rear portions;
   a first space defined above the middle portion and between the front and rear portions, with a horizontal position of the middle portion being lower than the top surfaces of the front and rear portions, wherein the first space has front and rear edges along the front and rear portions, with the first space being open on two sides of the saddle extending from the horizontal portion and between the front and rear edges of the space and between the front and rear portions;
   an elastic member to be filled with air and disposed between the front and rear portions and on the middle portion of the first space, with two side portions of the elastic member extendible in opposite directions parallel to the horizontal position outwardly from the two sides of the first space which are open; and
   a second space defined between the two rear portions and having a width smaller than a width of the first space between the two sides.

2. The bicycle saddle as claimed in claim 1 further comprising a cover member spread between the front and rear portions and covering the elastic member for supporting the rider's external genitals without substantially pressing the rider's external genitals and perineum.

3. The bicycle saddle as claimed in claim 2 wherein with the cover member attached, the two sides of the first space are still open and the two side portions of the elastic member are exposed out of the cover member.

4. A bicycle saddle comprising:
   a bottom;
   front and rear portions each having a top surface;
   a middle portion defined between and connecting the front and rear portions, with the bottom connecting the front and rear portions;
   a first space defined above the middle portion and between the front and rear portions, with a horizontal position of the middle portion being lower than the top surfaces of the front and rear portions, wherein the first space has front and rear edges along the front and rear portions, with the first space being open on two sides of the saddle extending from the horizontal portion and between the front and rear edges of the space and between the front and rear portions;
   an elastic member to be filled with air and disposed between the front and rear portions and on the middle portion of the first space, with two side portions of the elastic member extendible in opposite directions parallel to the horizontal position outwardly from the two sides of the first space which are open; and
   a cover member spread between the front and rear portions and covering the elastic member for supporting the rider's external genitals without substantially pressing the rider's external genitals and perineum.

5. The bicycle saddle as claimed in claim 4 wherein the front and rear portions include two rear portions opposite to the front portion, with the middle portion contiguously connecting the front portion and the two rear portions to each other.

6. The bicycle saddle as claimed in claim 5 further comprising two beams provided at the bottom and adapted for connecting the front portion to the two rear portions.

7. A bicycle saddle comprising:
   a bottom;
   front and rear portions each having a top surface;
   a middle portion defined between and connecting the front and rear portions, with the bottom connecting the front and rear portions;
   a first space defined above the middle portion and between the front and rear portions, with a horizontal position of the middle portion being lower than the top surfaces of the front and rear portions, wherein the first space has front and rear edges along the front and rear portions, with the first space being open on two sides of the saddle extending from the horizontal portion and between the front and rear edges of the space and between the front and rear portions;
   an elastic member to be filled with air and disposed between the front and rear portions and on the middle portion of the first space, with two side portions of the elastic member extendible in opposite directions parallel to the horizontal position outwardly from the two sides of the first space which are open; and
   a valve assembly installed to the bottom and including an air pump and an air escape valve, with the air pump adapted to pump air into the elastic member, with the air escape valve selectively in communication with the elastic member, with the elastic member not communicating with the air escape valve while the air escape valve is in a normal position and air is filled into the elastic member upon pumping of the air pump, and with the elastic member communicating with the air escape valve while the air escape valve is operated to a release position and air is released out of the elastic member via the air escape valve.

8. The bicycle saddle as claimed in claim 7 wherein the valve assembly is installed to the bottom between the front and middle portions.

9. The bicycle saddle as claimed in claim 7 wherein the valve assembly further includes a first connective valve and a second connective valve with the first connective valve adapted to communicate the air pump with the second connective valve, with the air escape valve selectively in communication with the first connective valve with the first connective valve not communicating with the air escape valve while the air escape valve is in a normal position and air passing through the first and second connective valves and filled into the elastic member upon pumping of the air pump, with the first connective valve communicating with the air escape valve while the air escape valve is operated to a release position and air is released out of the elastic member through the first and second connective valves and the air escape valve.

10. The bicycle saddle as claimed in claim 9 wherein the first connective valve is provided between the second connective valve and the air pump and connecting the second connective valve to the air pump via first and second connective nozzles, with the air escape valve installed to another side of the first connective valve opposite to the second connective valve and the air pump, and with an elastic element provided between the first connective valve and the air escape valve.

11. The bicycle saddle as claimed in claim 10 wherein the first connective valve includes a first section and a second section, with the first section being perpendicular to and in communication with the second section with first and second channels respectively formed in the first and second sections and selectively communicating with each other.

12. The bicycle saddle as claimed in claim 11 wherein the air pump includes a pressing member and a duct portion attached onto the pressing member with the pressing member pumped and air pumped by the pressing member passing through the duct portion with the duct portion connecting to the first section of the first connective valve via the first connective nozzle with a pump channel formed inside of the duct portion and communicating the air pump with the first connective valve.

13. The bicycle saddle as claimed in claim 12 wherein the second connective valve connects to the first section of the first connective valve via the second connective nozzle.

14. The bicycle saddle as claimed in claim 13 wherein the air escape valve is inserted to the second section of the first connective valve and includes an inserted portion and a pressed portion, with the elastic element mounted on the inserted portion, with an enlarged end formed on a distal end of the inserted portion.

15. The bicycle saddle as claimed in claim 14 wherein the second section of the first connective valve further includes a block portion and a receiving portion, with a diameter of the block portion being smaller than diameters of the enlarged end and the second channel of the second section, with the elastic element being received in the receiving portion and between the block portion and the pressed portion.

16. The bicycle saddle as claimed in claim 15 wherein the enlarged end is abutted against the block portion and the first and second channels do not communicate with each other while the air escape valve is in the normal position.

17. The bicycle saddle as claimed in claim 16 wherein the pressed portion is pressed toward the second section and the enlarged end is detached from the block portion and the first and second channels communicate with each other while the air escape valve is in the release position.

* * * * *